(12) United States Patent
Xiao et al.

(10) Patent No.: US 11,128,144 B2
(45) Date of Patent: Sep. 21, 2021

(54) GRID ACCESS CURRENT CONTROL METHOD WITHOUT CURRENT SENSOR APPLICABLE TO GRID-CONNECTED INVERTER

(71) Applicant: SOUTHEAST UNIVERSITY, Nanjing (CN)

(72) Inventors: Huafeng Xiao, Nanjing (CN); Zheng Wang, Nanjing (CN); Ming Cheng, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 103 days.

(21) Appl. No.: 16/627,363

(22) PCT Filed: Oct. 17, 2018

(86) PCT No.: PCT/CN2018/110576
§ 371 (c)(1),
(2) Date: Dec. 30, 2019

(87) PCT Pub. No.: WO2019/184305
PCT Pub. Date: Oct. 3, 2019

(65) Prior Publication Data
US 2020/0220361 A1    Jul. 9, 2020

(30) Foreign Application Priority Data

Mar. 29, 2018   (CN) .......................... 201810268747.3

(51) Int. Cl.
*H02J 3/46*      (2006.01)
*H02J 13/00*     (2006.01)
(Continued)

(52) U.S. Cl.
CPC .......... *H02J 3/46* (2013.01); *H02J 13/00009* (2020.01); *H02M 7/49* (2013.01); *H02M 7/4803* (2021.05)

(58) Field of Classification Search
CPC ........ H02J 3/46; H02J 13/00009; H02M 7/49; H02M 7/4803
(Continued)

(56) References Cited

U.S. PATENT DOCUMENTS 8,284,574 B2 * 10/2012 Chapman .............. H02M 7/537
363/41
2012/0087158 A1    4/2012 Chapman et al.

FOREIGN PATENT DOCUMENTS

CN      101741101 A    6/2010
CN      101944841 A    1/2011
(Continued)

*Primary Examiner* — Hal Kaplan
(74) *Attorney, Agent, or Firm* — Bayramoglu Law Offices LLC

(57) ABSTRACT

A grid access current control method without current sensor applicable to a grid-connected inverter relates to a system including a main circuit of the grid-connected inverter and a control circuit of the grid-connected inverter. The control circuit of the grid-connected inverter includes a grid access current open-loop control module and a PWM generation module; the grid access current open-loop control module includes a first proportional regulator, a second proportional regulator, a delayer, and an adder; input ends of the first proportional regulator and the second proportional regulator each are led out as an input end of a grid access current reference signal; and an output end of the first proportional regulator is connected to an input end of the adder; an output end of the second proportional regulator is connected to an input end of the delayer.

6 Claims, 4 Drawing Sheets

(51) Int. Cl.
*H02M 7/49* (2007.01)
*H02M 7/48* (2007.01)

(58) Field of Classification Search
USPC .......................................................... 700/286
See application file for complete search history.

(56) References Cited

FOREIGN PATENT DOCUMENTS

| CN | 102857133 A | 1/2013 |
|---|---|---|
| CN | 108448613 A | 8/2018 |

\* cited by examiner

GRID ACCESS CURRENT CONTROL METHOD WITHOUT CURRENT SENSOR APPLICABLE TO GRID-CONNECTED INVERTER

CROSS REFERENCE TO THE RELATED APPLICATIONS

This application is the national phase entry of International Application No. PCT/CN2018/110576, filed on Oct. 17, 2018, which is based upon and claims priority to Chinese Patent Application No. 201810268747.3, filed on Mar. 29, 2018, the entire contents of which are incorporated herein by reference.

TECHNICAL FIELD

The present disclosure relates to the technical field of grid access current control of a grid-connected inverter, in particular to a current control strategy for a grid-connected inverter suitable for accessing to power grids at various voltage levels, and specifically to a grid access current control method without the current sensor applicable to the grid-connected inverter.

BACKGROUND

At present, the rapid development of new energy sources, such as photovoltaic power stations and wind farms, requires a large number of grid-connected inverters to achieve feeding of power into the traditional grid. Meanwhile, offshore wind power is particularly suitable for feeding into an alternating current (AC) grid system by means of high-voltage direct current (DC) transmission. Therefore, a large number of power electronic converters connecting the DC system and the AC power grid operate in different voltage levels of the power system.

When the grid-connected inverter feeds power to the AC power grid, the grid-connected current control is generally employed to ensure the stable operation of the system and improve the quality of input power. At present, the mainstream grid access current control methods include proportional integral (PI) closed-loop control based on DQ rotation coordinates and proportional resonance (PR) closed-loop control based on static coordinates to achieve tracking of the grid access current without static errors. Among them, the PI closed-loop control based on DQ rotation coordinates requires complex coordinate transformation and inverse transformation, and the rotation frequency of coordinate transformation must be changed when the grid frequency changes; and the PR closed-loop control based on static coordinates does not require coordinate transformation, but when the grid frequency changes, the parameters of the PR controller need to be redesigned to achieve the expected performance, or the control performance degrades. In addition, in the scenarios such as power grid voltage imbalances and faults, the above two schemes drastically reduce the control performance, and greatly increase the design difficulty. By analyzing the system loop, it can be found that the currently commonly used control ideas based on closed-loop feedback include the changes in the operating parameters and the uncertainty of the operating state of the power grid into the closed-loop of the controller, which increases the difficulty of designing the controller of the inverter and the operating risk. Resonant and cascading fault reactions easily occur with the power grid.

In view of the technical problems existing in the grid access current control methods of the prior art, there is an urgent need to develop an current open-loop control scheme for the grid-connected inverter, where the scheme can cope with the operating conditions such as power grid voltage frequency changes, filter parameter changes and switching tube inconsistencies. Further, the scheme can adapt to harsh operation scenarios such as power grid harmonics, imbalances and faults. Therefore, the grid-connected grid access current control will cause the grid-connected inverter not to be affected by the operating parameters and operating states of the power grid.

SUMMARY

An objective of the present invention is to provide a grid access current control method without a current sensor applicable to the grid-connected inverter, so as to solve the problems currently existing in the PI closed-loop control based on DQ rotation coordinates and the PR closed-loop control based on static coordinates, such as complex controller structures, difficult parameter design, poor adaptability, and poor grid-connected adaptability.

In order to achieve the above objective, the present invention adopts the following technical solutions. A grid access current control method without a current sensor applicable to a grid-connected inverter, wherein the method relates to a system including a main circuit of the grid-connected inverter and a control circuit of the grid-connected inverter. The main circuit of the grid-connected inverter includes a distributed grid-connected inverter. The control circuit of the grid-connected inverter includes a grid access current open-loop control module and a Pulse-Width Modulation (PWM) generation module. The grid access current open-loop control module includes a first proportional regulator, a second proportional regulator, a delayer and an adder. Input ends of the first proportional regulator and the second proportional regulator each are led out as an input end of a grid access current reference signal. An output end of the first proportional regulator is connected to an input end of the adder, and an output end of the second proportional regulator is connected to an input end of the delayer. An output end of the delayer is connected to the input end of the adder, and an output end of the adder is connected to the PWM generation module. The control method based on the above system is specifically as follows. The grid access current reference signal is processed by proportion and delay through the grid access current open-loop control module, and is subjected to summing processing of the adder together with a common connection point voltage feedforward compensation signal and a switching tube voltage drop compensation signal to form a control modulation wave of the grid-connected inverter, wherein the common connection point voltage feedforward compensation signal and the switching tube voltage drop compensation signal are processed by the grid access current open-loop control module. The control modulation wave of the grid-connected inverter is fed into the PWM generation module to obtain a pulse width modulated signal for driving a switching device.

As an improvement of the present invention, the grid access current open-loop control module includes a grid-connected common connection point voltage feedforward compensation unit. An input end of the grid-connected common connection point voltage feedforward compensation unit is connected to a grid-connected common connection point voltage sampling port, and an output end of the grid-connected common connection point voltage feedforward compensation unit is connected to the input end of the adder.

As an improvement of the present invention, the grid access current open-loop control module further includes a switching tube voltage drop compensation unit in the main circuit of the grid-connected inverter. An input end of the switching tube voltage drop compensation unit in the main circuit of the grid-connected inverter is connected to a DC side of the distributed grid-connected inverter (obtaining a voltage at the DC side of the grid-connected inverter) and an output point of an AC bridge arm of the distributed grid-connected inverter (obtaining a sampling signal of a voltage at the output point of the AC bridge arm of the inverter). An output end of the switching tube voltage drop compensation unit in the main circuit of the grid-connected inverter is connected to the input end of the adder.

As an improvement of the present invention, a proportion of the first proportional regulator is adjusted to a constant amplification factor $K_1$, a proportion of the second proportional regulator is adjusted to a constant amplification factor $K_2$, and a delay of the delayer is calculated by using a coefficient $e^{-\Delta t}$.

As an improvement of the present invention, a calculation method of voltage feedforward compensation of the grid-connected common connection point voltage feedforward compensation unit is to multiply a sampling value of a grid voltage by an amplification factor $K_g$.

As an improvement of the present invention, a calculation method of the switching tube voltage drop compensation unit in the main circuit of the grid-connected inverter is to multiply a difference between the absolute value of a voltage at the DC side of the inverter and the absolute value of a voltage at a midpoint of the bridge arm of the inverter by an amplification factor $K_c$.

Compared with the prior art, the present invention has the following advantages. The present current control method is used to solve the current control of the grid-connected inverter connected to the power grid at various voltage levels. Parameter design of the control circuit of the grid-connected inverter in the system is simple without a grid access current detection sensor. By the system, only the voltage at the common connection point of the grid-connected inverter connected to the power grid is required to be used, and the output current of the grid-connected inverter is not required to be sampled. The grid access current reference signal only needs to be processed by proportion and delay, and forms a control modulation wave of the grid-connected inverter together with common connection point voltage feedforward compensation signal and switching tube voltage drop compensation signal, and then the control modulation wave of the grid-connected inverter is fed into the PWM generation module to obtain a pulse width modulated signal for driving a switching device. The open-loop current control method adopted by the present system can implement tracking of the grid access current reference signal without static errors by the grid access alternating current without being affected by the operating parameters and operating states of the power grid, and avoids the possibility of resonant and cascading faults with the power grid and adjacent distributed power sources, thereby greatly improving the safe operation of the distributed power sources. In addition, the strong adaptability to the power grid voltage frequency changes, the filter parameter changes and the switching tube inconsistencies, can adapt to adverse operating scenarios such as power grid harmonics, imbalances, and faults, thereby greatly providing the power-grid-friendliness of the grid-connected inverter.

DETAILED DESCRIPTION OF THE EMBODIMENTS

In order to deepen the understanding and recognition of the present invention, the present invention is further described and introduced with reference to the drawings and the preferred embodiments.

Figure 1:
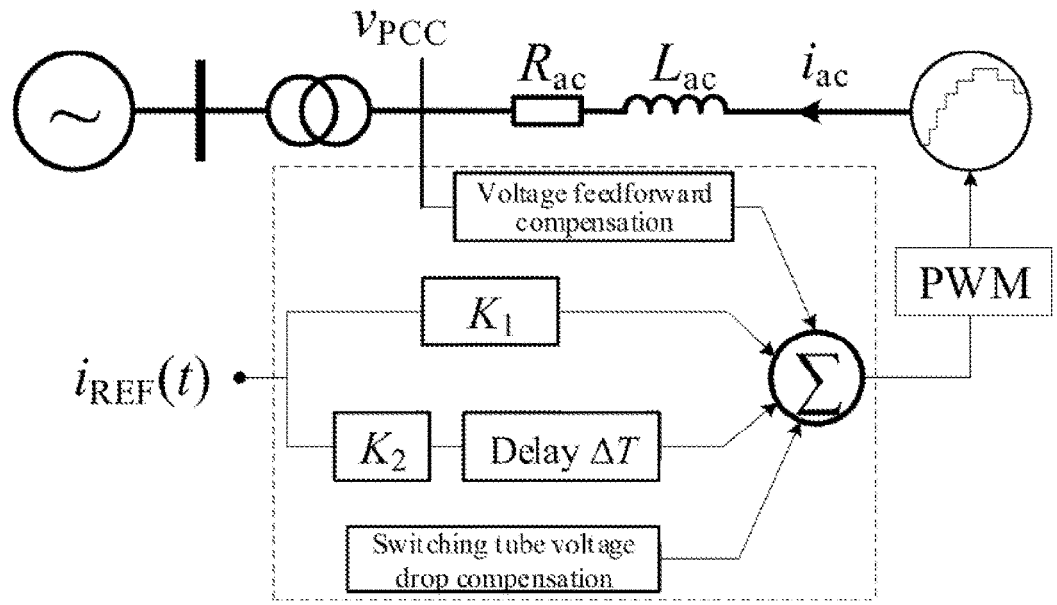
FIG. 1 is a schematic diagram of a system structure in a universal connection mode for a grid-connected inverter according to the present invention.

As shown in FIG. 1, a grid access current control method without a current sensor applicable to a grid-connected inverter is provided, and the method relates to a system including a main circuit of the grid-connected inverter and a control circuit of the grid-connected inverter, wherein the main circuit of the grid-connected inverter includes a distributed grid-connected inverter. The control circuit of the grid-connected inverter includes a grid access current open-loop control module and a PWM generation module. The grid access current open-loop control module includes a first proportional regulator, a second proportional regulator, a delayer and an adder. Input ends of the first proportional regulator and the second proportional regulator each are led out as an input end of a grid access current reference signal. The output end of the first proportional regulator is connected to the input end of the adder. The output end of the second proportional regulator is connected to the input end of the delayer. The output end of the delayer is connected to the input end of the adder, and the output end of the adder is connected to the PWM generation module.

The control method of the current control system based on the above grid-connected inverter without the current sensor is specifically as follows. The grid access current reference signal is processed by proportion and delay through the grid access current open-loop control module, and is subjected to summing processing of the adder together with a common connection point voltage feedforward compensation signal and a switching tube voltage drop compensation signal to form a control modulation wave of the grid-connected inverter, wherein the common connection point voltage feedforward compensation signal and the switching tube voltage drop compensation signal are processed by the grid access current open-loop control module. The control modulation wave of the grid-connected inverter is fed into the PWM generation module to obtain a pulse width modulated signal for driving a switching device. In the present current control method, there is no need to sample the grid-connected current signal, and the grid access current control uses an open-loop control manner.

In order to further improve the accuracy of current control, the grid-connected current open-loop control module further includes a grid-connected common connection point voltage feedforward compensation unit and a switching tube voltage drop compensation unit in the main circuit of the grid-connected inverter. The input end of the grid-connected common connection point voltage feedforward compensation unit is connected to the grid-connected common connection point voltage sampling port, and the output end of the grid-connected common connection point voltage feedforward compensation unit is connected to the input end of the adder. The input end of the switching tube voltage drop compensation unit in the main circuit of the grid-connected inverter is connected to the DC side of the distributed grid-connected inverter and the output point of the AC bridge arm of the distributed grid-connected inverter, and the output end of the switching tube voltage drop compensation unit in the main circuit of the grid-connected inverter is connected to the input end of the adder.

An instantaneous value of the grid voltage at the common connection point of the distributed grid-connected inverter is detected, and a voltage feedforward compensation amount is obtained by multiplying the instantaneous value with a feedforward coefficient $K_g$, and phase information is provided for the grid access current reference signal by detecting the grid voltage phase information with a phase-locked loop.

Figure 2:
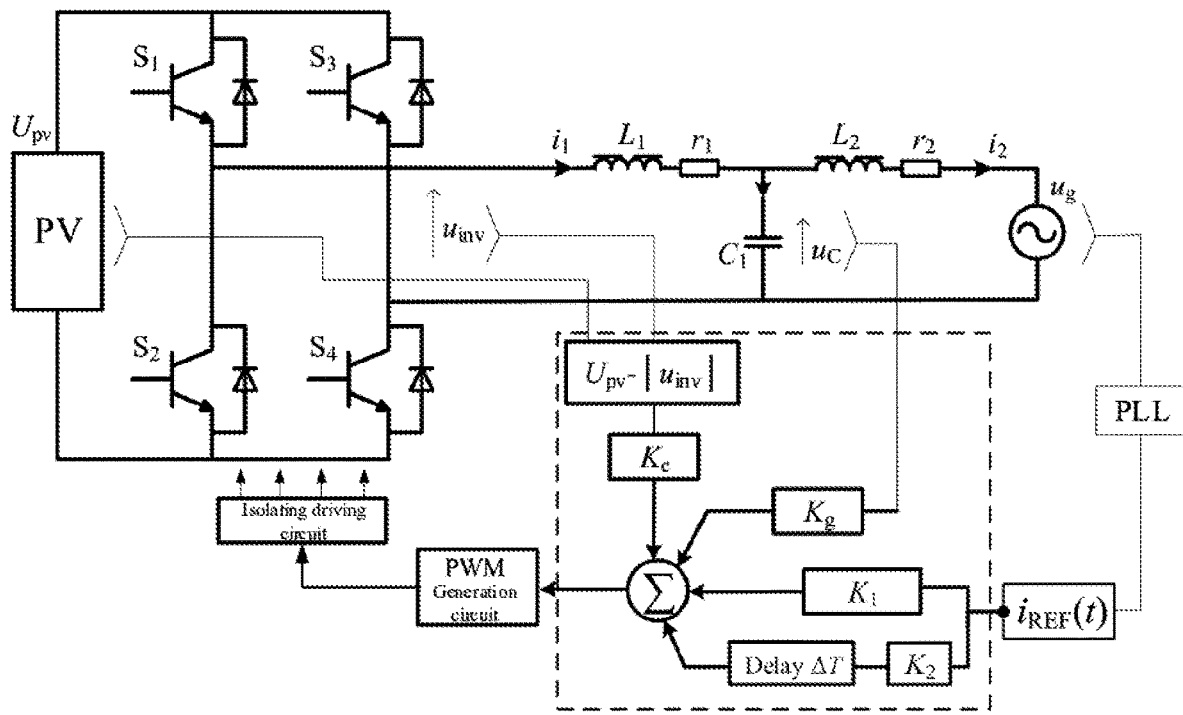
FIG. 2 is a schematic connection diagram of a photovoltaic grid-connected inverter with an LCL filter in a preferred embodiment according to the present invention.

Embodiment: as shown in FIG. 2, a circuit connection diagram used in the scenario of a single-phase photovoltaic grid-connected inverter with an LCL filter is given, phase information is provided for a grid access current reference signal by performing phase locking of multiple grid voltages, and a feedforward compensation amount is provided by detecting an instantaneous value of a capacitor voltage in the LCL filter; the bridge arm output voltage and the input DC voltage are detected and fed into the switching tube voltage drop compensation unit; and the grid access current reference signal passes through the first proportional regulator, the second proportional regulator and the delayer of the grid access current open-loop control module and forms a modulated wave together with the feedforward compensation amount and the switching tube voltage drop compensation amount, and then the modulated wave is fed into the PWM generation module.

Specifically, a proportion of the first proportional regulator is adjusted to a constant amplification factor $K_1$, a proportion of the second proportional regulator is adjusted to a constant amplification factor $K_2$, and a delay of the delayer is calculated by using a coefficient $e^{-\Delta t}$.

In addition, a calculation method of voltage feedforward compensation of the grid-connected common connection point voltage feedforward compensation unit is to multiply a sampling value of a grid voltage by an amplification factor $K_g$. A calculation method of the switching tube voltage drop compensation unit in the main circuit of the grid-connected inverter is to multiply a difference between the absolute value of a voltage at the DC side of the inverter and the absolute value of a voltage at a midpoint of the bridge arm of the inverter by an amplification factor $K_c$.

Figure 3:
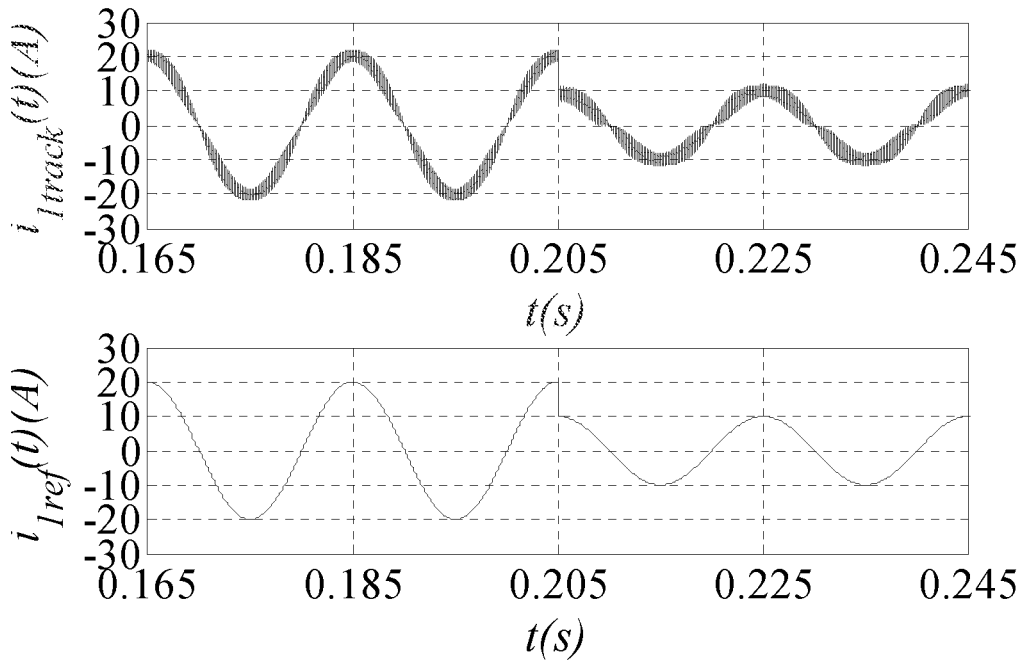
FIG. 3 is a waveform diagram of a grid current response when a grid access current reference signal abruptly changes under normal operating conditions in a preferred embodiment according to the present invention.

In FIG. 3, waveforms of the grid access current reference signal and the inductor current on the inverter side in the above-mentioned embodiment under a rated normal operation scenario are given. During the steady-state operation, the inductor current on the inverter side accurately tracks the grid access current reference signal, and the steady-state error is close to zero.

Figure 4:
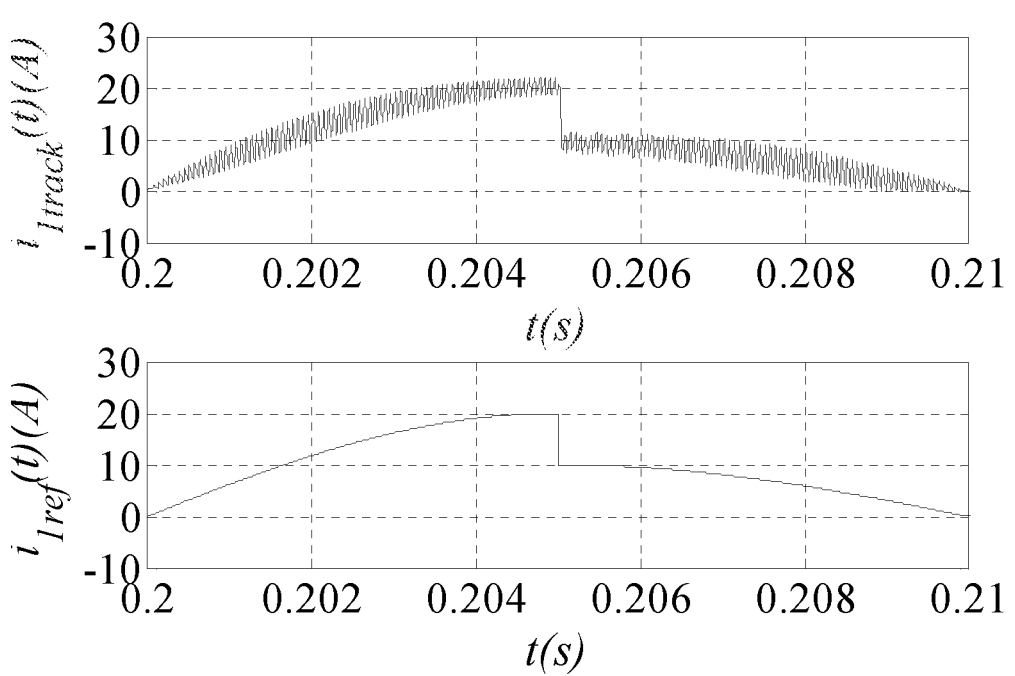
FIG. 4 is an enlarged waveform diagram of a grid current response when a grid access current reference signal abruptly changes under normal operating conditions in a preferred embodiment according to the present invention.

In FIG. 4, waveforms of an abrupt change of a grid access current reference signal and an inductor current on an inverter side in the above-mentioned embodiment under the rated normal operating scenario are given. During the dynamic state, the inductor current on the inverter side quickly and accurately tracks the grid access current reference signal without current overshoot.

Figure 5:
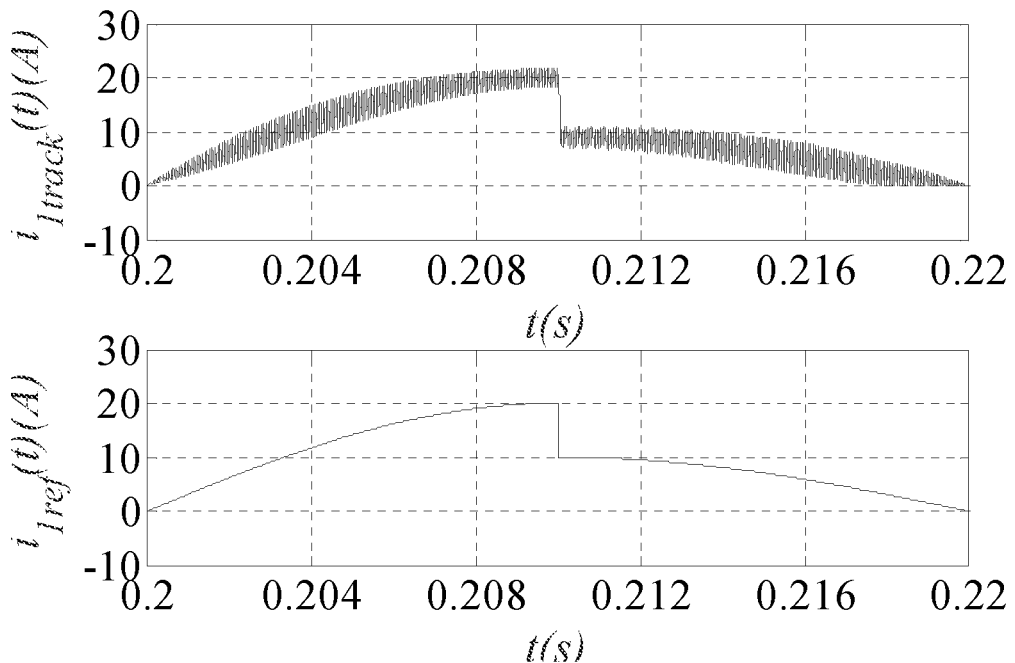
FIG. 5 is a waveform diagram of a grid current response when a grid access current reference signal abruptly changes at the power grid frequency being lowered to 25 Hz in a preferred embodiment according to the present invention.

In FIG. 5, waveforms of an abrupt change of a grid access current reference signal and an inductor current on an inverter side in the above-mentioned embodiment under an operating scenario of the power grid frequency being lowered to 25 Hz are given. Likewise, during the dynamic state, the inductor current on the inverter side quickly and accurately tracks the grid access current reference signal without current overshoot.

Figure 6:
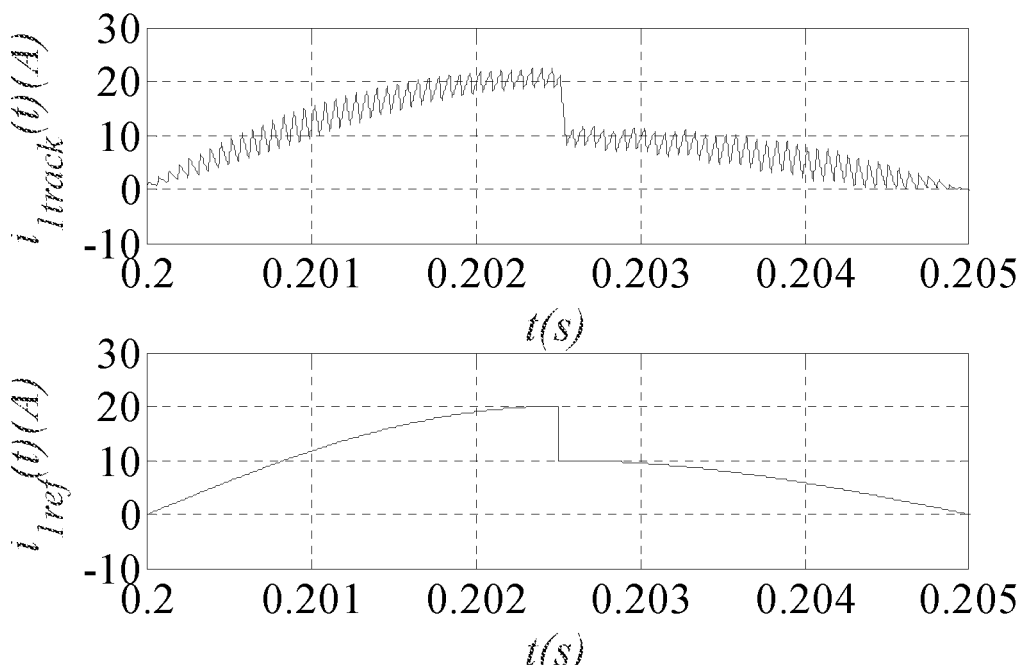
FIG. 6 is a waveform diagram of a grid current response when a grid access current reference signal abruptly changes at the power grid frequency being raised to 100 Hz in a preferred embodiment according to the present invention.

In FIG. 6, waveforms of an abrupt change of a grid access current reference signal and an inductor current on an inverter side in the above-mentioned embodiment under an operating scenario of the power grid frequency being raised to 100 Hz are given. Likewise, during the dynamic state, the inductor current on the inverter side quickly and accurately tracks the grid access current reference signal without current overshoot.

Figure 7:
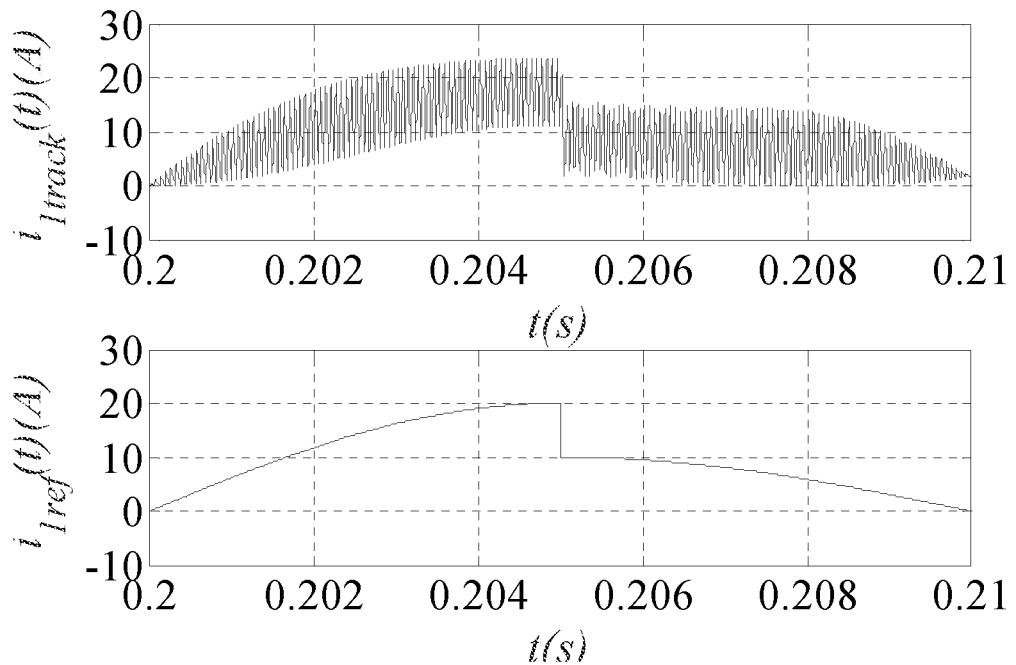
FIG. 7 is a waveform diagram of a grid current response when a grid access current reference signal abruptly changes at a filter parameter value being halved in a preferred embodiment according to the present invention.

In FIG. 7, waveforms of an abrupt change of a grid access current reference signal and an inductor current on an inverter side in the above-mentioned embodiment under an operating scenario of a filter parameter value being halved are given. During the dynamic state, the inductor current on the inverter side can still track the grid access current reference signal.

Figure 8:
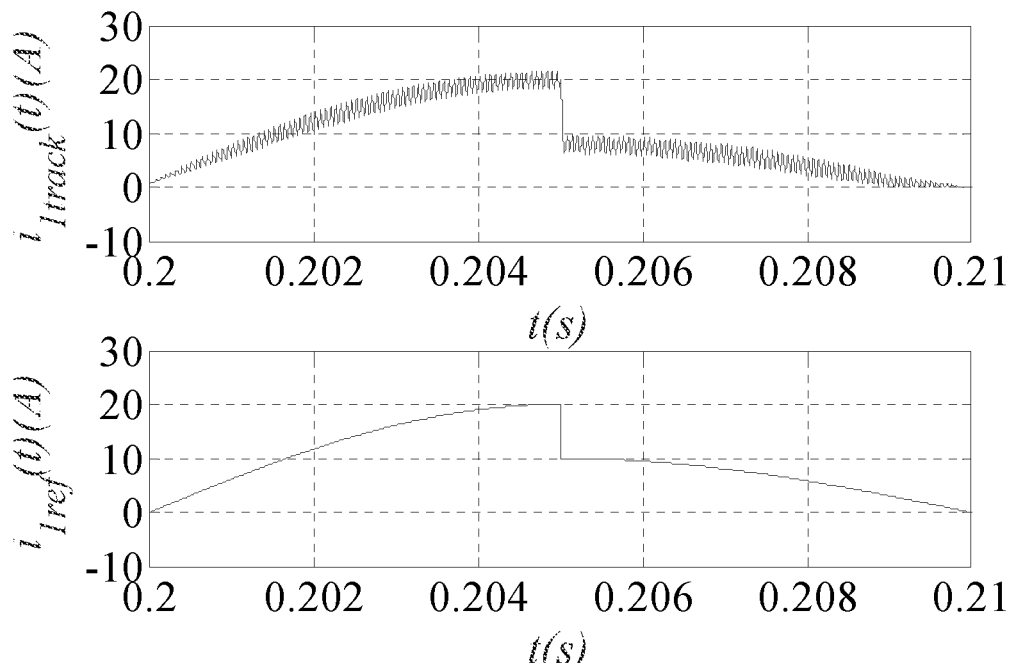
FIG. 8 is a waveform diagram of a grid current response when a grid access current reference signal abruptly changes at a filter parameter value being doubled in a preferred embodiment according to the present invention.

In FIG. 8, waveforms of an abrupt change of a grid access current reference signal and an inductor current on an inverter side in the above-mentioned embodiment under an operating scenario of a filter parameter value being doubled are given. Likewise, during the dynamic state, the inductor current on the inverter side quickly and accurately tracks the grid access current reference signal without current overshoot.

It should be noted that the above embodiments are not intended to limit the protective scope of the present invention, and equivalent transformations or substitutions made on the basis of the above technical solutions fall within the scope claimed by the claims of the present invention. In the claims, the words "comprising" or "comprises" do not exclude the presence of elements or steps not listed in the claims. The use of the words "first" and "second" does not indicate any order, and these words may be interpreted as names.

What is claimed is:

1. A grid access current control method without a current sensor applicable to a grid-connected inverter, relating to a system comprising a main circuit of the grid-connected inverter and a control circuit of the grid-connected inverter;

wherein, the main circuit of the grid-connected inverter comprises a distributed grid-connected inverter; the control circuit of the grid-connected inverter comprises a grid access current open-loop control module and a PWM generation module; the grid access current open-loop control module comprises a first proportional regulator, a second proportional regulator, a delayer, and an adder; an input end of the first proportional regulator and an input end of the second proportional regulator each are led out as an input end of a grid access current reference signal; an output end of the first proportional regulator is connected to an input end of the adder; an output end of the second proportional regulator is connected to an input end of the delayer; an output end of the delayer is connected to the input end of the adder; an output end of the adder is connected to the PWM generation module; the grid access current reference signal is processed by proportion and delay through the grid access current open-loop control module, and is subjected to summing processing of the adder together with a common connection point voltage feedforward compensation signal and a switching tube voltage drop compensation signal to form a control modulation wave of the grid-connected inverter, wherein the common connection point voltage feedforward compensation signal and the switching tube voltage drop compensation signal are processed by the grid access current open-loop control module; and the control modulation wave of the grid-connected inverter is fed into the PWM generation module to obtain a pulse width modulated signal for driving a switching device.

2. The grid access current control method without the current sensor applicable to the grid-connected inverter according to claim 1, wherein, the grid access current open-loop control module comprises a grid-connected common connection point voltage feedforward compensation unit; an input end of the grid-connected common connection point voltage feedforward compensation unit is connected to a grid-connected common connection point voltage sampling port, and an output end of the grid-connected common connection point voltage feedforward compensation unit is connected to the input end of the adder.

3. The grid access current control method without the current sensor applicable to the grid-connected inverter according to claim 2, wherein, the grid access current open-loop control module comprises a switching tube voltage drop compensation unit in the main circuit of the grid-connected inverter; an input end of the switching tube voltage drop compensation unit in the main circuit of the grid-connected inverter is connected to a DC side of the distributed grid-connected inverter and an output point of an AC bridge arm of the distributed grid-connected inverter, and an output end of the switching tube voltage drop compensation unit in the main circuit of the grid-connected inverter is connected to the input end of the adder.

4. The grid access current control method without the current sensor applicable to the grid-connected inverter according to claim 3, wherein, a proportion of the first proportional regulator is adjusted to a constant amplification factor $K_1$, a proportion of the second proportional regulator is adjusted to a constant amplification factor $K_2$, and a delay of the delayer is calculated by using a coefficient $e^{-\Delta t}$.

5. The grid access current control method without the current sensor applicable to the grid-connected inverter according to claim 4, wherein, a calculation method of voltage feedforward compensation of the grid-connected common connection point voltage feedforward compensation unit is to multiply a sampling value of a grid voltage by an amplification factor $K_g$.

6. The grid access current control method without the current sensor applicable to the grid-connected inverter according to claim 5, wherein, a calculation method of the switching tube voltage drop compensation unit in the main circuit of the grid-connected inverter is to multiply a difference between a absolute value of a voltage at the DC side of the distributed grid-connected inverter and a absolute value of a voltage at a midpoint of the AC bridge arm of the distributed grid-connected inverter by an amplification factor $K_c$.

* * * * *